Feb. 26, 1935.  H. P. CHANDLER  1,992,471
TROLLEY WIRE SUPPORT
Filed March 8, 1934
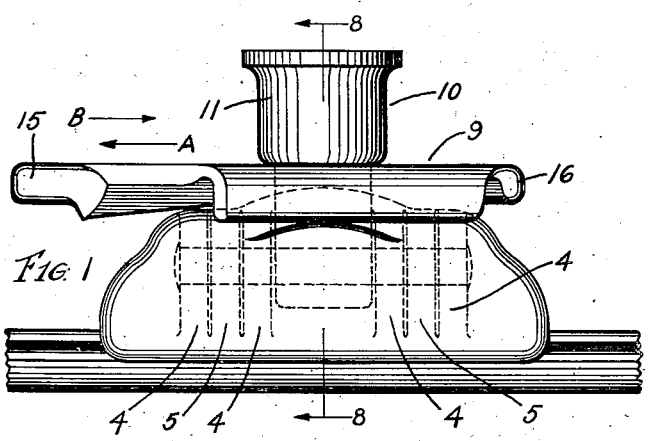
Inventor
HOMER P. CHANDLER
By
Attorney Patented Feb. 26, 1935

1,992,471

UNITED STATES PATENT OFFICE 1,992,471

TROLLEY WIRE SUPPORT

Homer P. Chandler, Mansfield, Ohio, assignor to The Ohio Brass Company, Mansfield, Ohio, a corporation of New Jersey Application March 8, 1934, Serial No. 714,645

19 Claims. (Cl. 191—43)

My invention relates to supports for conductors and has particular reference to clamp supports for securing the conductor to an overhead hanger as in the case of supporting a trolley wire from an insulated hanger.

The object of my invention is to provide a clamp of the type known as "wedging" in which the jaws are moved through the medium of a wedge and a further object is to arrange the wedge and jaws so that through cooperation the jaws will be moved both to clamping and releasing positions depending upon the direction of movement of the wedge.

In the case of wedging clamps now upon the market the movement of the wedge in one direction will force the jaws into gripping engagement with the trolley wire but when the wedge is moved in the opposite direction the wedge does not move the jaws but merely releases the jaws so that they are moved out of engagement with the trolley wire either by means of a spring or manually.

In my invention the jaws are moved into and out of engagement with the trolley wire by means of a wedge depending upon the direction of movement of the wedge relative to the jaws.

My invention resides in the new and novel construction, combination and arrangement of the parts herein described and shown in the accompanying drawing.

In the drawing:—

Fig. 1 is a side view in elevation of my invention as applied to a trolley wire.

Fig. 2 is an end view of Fig. 1.

Fig. 3 is a face view of the wedging member showing the relation of the wedging planes.

Fig. 4 is a top plan view of Fig. 3.

Figs. 5 and 6 are transverse sectional views on the lines 5 and 6 respectively of Fig. 3.

Fig. 7 is a side view in elevation of the supporting stud.

Fig. 8 is a transverse sectional view on the line 8—8 showing the relation of the parts when the jaws are in gripping relation with a trolley wire.

Fig. 9 is a view similar to Fig. 8 showing the relation of the clamp members when the jaws are in a released position.

In the preferred embodiment of my invention I provide a pair of clamping jaws 1 having lips 2 to engage and grip the trolley conductor 3 and also having inwardly projecting lugs 4 and 5 alternately placed with respect to each other and provided with registering apertures 6 to receive a pintl 7 upon which the jaws pivot.

The jaws 1 are also provided with slightly outward projecting lips 8 adjacent the upper edge of the jaw to engage with a wedge member 9.

The jaws are arranged to be secured to an overhead hanger by means of a supporting stud 10 which comprises a threaded boss 11 with a depending projecting member 12 having a through-aperture 13 to receive the pintl 7.

The lugs 4 and 5 and projecting member 12 are so proportioned and positioned that when assembled they cooperate to prevent longitudinal displacement of the jaws and lateral displacement is prevented through the cooperation of the pintl with the members 4, 5 and 12. The pintl is prevented from dis-assembly by upsetting the ends thereof.

The wedge member 9 may be described as an elongated plate having a central elongated aperture 14 through which projects the member 12 of the supporting stud 12. The wedge 9 is slidable in a longitudinal direction relative to the jaws 1 and supporting stud 10. At each end of the wedge are projecting portions 15 and 16 which receive the hammer blows when moving the wedge in one direction or the other.

Projecting from the lower face of the wedge plate are obliquely disposed flanges 17. Also projecting from the lower face of the wedge plate are wedge-shaped flanges 18. The inner faces 19 are shown as parallel and the outer faces 20 are shown as obliquely disposed but parallel to the inner faces 21 of the outer flanges 17.

The spaces between the faces 20 and 21 form obliquely disposed grooves 22 and in which grooves are positioned the lips 8 of the jaws 1.

The faces 20 and 21 of the groove 22 engage with the adjacent sides of the lip 8 to move the jaws 1 upon the pintl 7 when the wedge is moved in one direction or the other.

To install the clamp upon a wire, it is only necessary to manually slide the wedge in the direction A shown by the arrow in Fig. 1. This will cause the jaws to open at lower edge as shown in Fig. 9.

The trolley wire is then positioned in the groove 23 between the lips 2 and the wedge member is then moved in the direction of the arrow B, which will cause the jaws to be moved together at the lower edge thus closing the lips upon the trolley wire. Force may be applied to the portion 15 of the wedge by means of a hammer to secure the engagement between the jaws and the trolley wire.

To release the clamp from the trolley wire it is only necessary to apply force to the portion 16 of the wedge thus sliding the wedge in the direction of the arrow A, causing the jaws to open.

It will be apparent that the movement of the wedge in one direction or the other applies a force upon the upper edge of the jaws 1 and thereby forcing the jaws in one direction or another through the medium of the wedge, thus providing a positive means of clamping and releasing the jaws from the trolley wire.

The engagement of the wedge with the jaws maintains the jaws in either their opened or closed position thus avoiding the use of springs for maintaining the jaws in an open position, as is the case with some types of clamps.

Modifications will suggest themselves to those skilled in the art, therefore, I wish to be limited only by my claims.

I claim:—

1. A clamp comprising in combination a pair of jaws with means to engage and grip a trolley wire, alternately placed orificed-lugs on each jaw with the orifices aligned, a pintl through the orifices and upon which the jaws pivot, a supporting stud pivotally mounted upon the pintl and having a threaded boss to receive a hanger and a longitudinally movable wedge member having projecting flanges on one face arranged to form a longitudinal groove on each side of the supporting stud, the grooves diverging and converging and a portion of the jaws positioned in the grooves to engage the sides thereof whereby a movement of the wedge member in one direction will close the jaws upon the wire and a movement in the other direction will release the jaws from the wire.

2. A conductor clamp comprising in combination a support, a pair of jaws cooperating therewith to move into and out of engagement with a conductor, a non-rotating longitudinally reciprocating member cooperating with the jaws to move the jaws into and out of engagement with the conductor when the said member is moved in one direction or the other and to hold the jaws in their open position when not in engagement with the conductor.

3. A conductor clamp comprising in combination a support to secure the clamp to a hanger, a pair of jaws to grip a conductor and a non-rotating longitudinally reciprocating member to move the jaws either into or out of engagement with the conductor at will.

4. A conductor clamp comprising in combination a pair of jaws to grip a conductor, means to secure the jaws to a hanger and longitudinally slidable means to move the jaws into or out of engagement with the conductor and maintain the jaws either in engagement or out of engagement with the conductor.

5. A conductor clamp comprising in combination a pair of jaws to be moved into and out of engagement with a conductor, a support for the jaws, a wedge member movable in a longitudinal direction to move the jaws either into or out of engagement with the conductor at will.

6. A conductor clamp comprising in combination a pair of jaws to be moved into and out of engagement with a conductor, a support for the jaws, a wedge member movable in a longitudinal direction to move the jaws either into or out of engagement with the conductor at will and maintain the jaws in engagement or disengagement with the conductor.

7. A conductor clamp comprising in combination a pair of jaws to engage a conductor and operating means slidable in the longitudinal direction of the conductor engaging each jaw to move the jaws towards or away from the conductor and means to secure the jaws and operating means to a support.

8. A conductor clamp comprising in combination a support, a pair of jaws pivotally secured thereto and movable into and out of engagement with a conductor, a longitudinally slidable member to move the jaws either into or out of engagement with the conductor at will, the slidable member having a pair of non-parallel grooves to coact with the jaws to move the jaws to grip or release the conductor depending upon the direction of movement of the slidable member.

9. A conductor clamp comprising in combination a support, a pair of jaws pivotally secured to the support and movable into and out of engagement with a conductor, a longitudinally slidable member to move the jaws either into or out of engagement with the conductor at will, the slidable member having a pair of depending flanges on each side of the support and each pair arranged to engage a part of the adjacent jaw, each pair of flanges being angularly disposed to the other pair to form wedges, one flange of each pair moving the jaws into engagement with the conductor and the other flange of each pair moving the jaws out of engagement with the conductor, depending upon the direction in which the slidable member is moved.

10. A conductor clamp comprising in combination a support to secure the clamp to a hanger, a pair of jaws to grip a conductor and a longitudinally slidable member to move the jaws out of engagement with the conductor.

11. A conductor clamp comprising in combination a support to secure the clamp to a hanger, a pair of jaws to grip a conductor and a longitudinally slidable member to move and maintain the jaws out of engagement with the conductor.

12. A conductor clamp comprising in combination a support to secure the clamp to a hanger, a pair of jaws to grip a conductor and a longitudinally reciprocal member to move the jaws out of engagement with the conductor, the member comprising a longitudinally slidable wedge operating on the jaws.

13. A conductor clamp comprising in combination a support to secure the clamp to a hanger, a pair of jaws to grip a conductor and a longitudinally reciprocal member to move and maintain the jaws out of engagement with the conductor, the said member comprising wedge means to engage with the jaws and means on the support to hold the wedge means in cooperative relation with the jaws.

14. A conductor clamp comprising in combination a support to secure the clamp to a hanger, a pair of jaws to grip a conductor and a longitudinally reciprocal member to move the jaws either into or out of engagement with the conductor at will, the said member comprising a wedge positioned between the support and jaws and operating on the jaws.

15. A wedge for a trolley wire clamp comprising an elongated body member having an elongated central slot closed at the ends, a longitudinally disposed groove on each side of the slot and formed by depending flanges, the longitudinal axes of the grooves being angularly disposed to each other and to the longitudinal axis of the slot.

16. A wedge for a trolley wire clamp comprising an elongated body member having an elongated central opening, a pair of depending spaced flanges on each side of the said opening, the flanges of each pair extending from opposite ends of the body member towards the other ends and overlapping intermediate the ends of the body member to form a groove, the grooves diverging.

17. A trolley wire clamp-wedge comprising a body having a centrally disposed elongated opening, a pair of spaced depending flanges on each side of the slot and extending longitudinally of the body, the adjacent faces of the flanges of each pair being angularly disposed to the longitudinal axis of the opening.

18. A trolley wire clamp-wedge comprising a body having a central elongated opening, elongated and longitudinally and angularly disposed means on each side of the slot, the said means adapted to engage with jaws on the clamp to operate the jaws, the longitudinal axes of said means being angularly disposed to the longitudinal axis of the opening.

19. A conductor clamp comprising in combination a support to secure the clamp to a hanger, a pair of jaws to grip a conductor, a longitudinally slidable member to move and maintain the jaws out of engagement with the conductor, the said member held against displacement by the said support.

HOMER P. CHANDLER.